(12) United States Patent
Rohr et al.

(10) Patent No.: US 9,716,374 B2
(45) Date of Patent: Jul. 25, 2017

(54) SYSTEMS AND METHODS FOR ELECTRICAL HARNESS CONSTRUCTION

(71) Applicant: Rohr, Inc., Chula Vista, CA (US)

(72) Inventors: Thomas Rohr, San Diego, CA (US); Douglas G Manning, Glasgow (GB); William Aitken, Ayershire (GB)

(73) Assignee: Rohr, Inc., Chula Vista, CA (US)

( * ) Notice: Subject to any disclaimer, the term of this patent is extended or adjusted under 35 U.S.C. 154(b) by 53 days.

(21) Appl. No.: 14/147,391

(22) Filed: Jan. 3, 2014

(65) Prior Publication Data

US 2015/0194795 A1 Jul. 9, 2015

(51) Int. Cl.
*H02G 3/04* (2006.01)
*H01R 9/03* (2006.01)
(Continued)

(52) U.S. Cl.
CPC ..... *H02G 3/0406* (2013.01); *H01B 13/01263* (2013.01); *H01R 9/032* (2013.01);
(Continued)

(58) Field of Classification Search
CPC .............................. H01B 11/06; H01R 13/648
(Continued)

(56) References Cited

U.S. PATENT DOCUMENTS

2008/0135273 A1* 6/2008 Siems ............................. 174/36
2012/0021218 A1* 1/2012 Lee .................... C09K 19/3809
428/395

(Continued)

FOREIGN PATENT DOCUMENTS

CN 101553886 10/2009
CN 102687342 9/2012
(Continued)

OTHER PUBLICATIONS

Vinay Gupta; Carbon/Kevlar/PEEK Thermoplastic Composites, Sep. 2002, Sage Journals Department ofApplied Chemistry, Aichi Institute of Technology, Yakusa, Toyota, 470-0392, Japan;vingg@yahoo.com R. B. Mathur; T. L. Dhami; O. P. Bahl Carbon Technology Unit, National Physical Laboratory, New Delhi, 110012, India.*

(Continued)

*Primary Examiner* — Hoa C Nguyen
*Assistant Examiner* — Stanley Tso
(74) *Attorney, Agent, or Firm* — Snell & Wilmer L.L.P.

(57) ABSTRACT

Electrical harnesses and methods of manufacturing electrical harnesses are disclosed. The electrical harnesses may comprise an electrically conductive wire, an electrical connector in electrical communication with the conductive wire, a metal clad fiber ("MCF") braided shield surrounding a portion of the electrically conductive wire, and an overbraid surrounding a portion of the MCF braided shield, wherein the electrical connector comprises an integrated backshell. Methods of making electrical harnesses may comprise connecting an electrical connector with a conductive wire, disposing a metal clad fiber ("MCF") braided shield to at least partially surround the conductive wire; and disposing an overbraid to at least partially surround the MCF braided shield, wherein the electrical connector comprises an integrated backshell.

13 Claims, 13 Drawing Sheets

(51) Int. Cl.
    *H01R 43/28* (2006.01)
    *H01B 13/012* (2006.01)
    *H01R 43/01* (2006.01)
(52) U.S. Cl.
    CPC .............. *H01R 43/01* (2013.01); *H01R 43/28* (2013.01); *Y10T 29/49174* (2015.01)
(58) Field of Classification Search
    USPC ........................................................ 174/72 A
    See application file for complete search history.

(56) References Cited

U.S. PATENT DOCUMENTS

2012/0322303 A1* 12/2012 Charpentier ......... H01R 9/0518
                                                          439/578
2013/0084728 A1*  4/2013 Omae ..................... H01R 4/646
                                                          439/271

FOREIGN PATENT DOCUMENTS

| | | |
|---|---|---|
| CN | 203311900 | 11/2013 |
| DE | 10350607 | 6/2005 |
| JP | 5307277 | 10/2013 |
| WO | 2013077465 | 5/2013 |

OTHER PUBLICATIONS

European Search Report dated Apr. 16, 2015 in European Application 14199105.9, Abstract retrieved on Jun. 30, 2015 from http://hip.sagepub.com/content/14/3/285.short.*
Extended European Search Report dated Apr. 16, 2015 in European Application No. 14199105.9.
Office Action dated Dec. 14, 2016 in Chinese Application No. 201410848420.5.
Communication Pursuant to Article 94(3) EPC dated Jul. 8, 2016 in European Application No. 14199105.9.

* cited by examiner

SYSTEMS AND METHODS FOR ELECTRICAL HARNESS CONSTRUCTION

BACKGROUND

Electrical harnesses typically comprise wires and cables arranged such that they may be inserted and/or connected, or may be disconnected, together. Thus, electrical harnesses are often used to distribute signals and power to various components, such as to the various components in and around a gas turbine engine (e.g., on an aircraft), or to and from electrical components of an aircraft landing gear. Electrical power and signals to and from the individual electrical components are commonly transmitted along conductive wires. Conventionally, such conductors may be in the form of wires and/or cables which may be assembled together in a harness. The connections between the individual components and the harness can be made, for example, by a multi-pin plug and/or a socket connector. To help navigate various engine components (e.g., the electrical components in a turbine engine) or other electrical components (e.g., the landing gear of an aircraft), the harness may split at various points and may have one or more backshells to help direct the position of the harness and to protect the harness.

Harnesses may comprise many insulated wires and cables, which can make the harness bulky, heavy, and difficult to manipulate. Therefore, separate backshells can be used to aid in the manipulation of and preservation of the harness position. However, separate backshells can become a source of failure and can also contribute to the weight of a harness.

SUMMARY

Electrical harnesses, systems incorporating electrical harnesses, and methods of making electrical harnesses are disclosed herein. In various embodiments, electrical harnesses are disclosed comprising an electrically conductive wire, an electrical connector in electrical communication with the conductive wire, a metal clad fiber ("MCF") braided shield surrounding a portion of the electrically conductive wire, and an overbraid surrounding a portion of the MCF braided shield, wherein the electrical connector comprises an integrated backshell.

In various embodiments, methods of making such an electrical harness may comprise connecting an electrical connector with a conductive wire, disposing a metal clad fiber ("MCF") braided shield to at least partially surround the conductive wire; and disposing an overbraid to at least partially surround the MCF braided shield, wherein the electrical connector comprises an integrated backshell.

DETAILED DESCRIPTION

Figure 1:
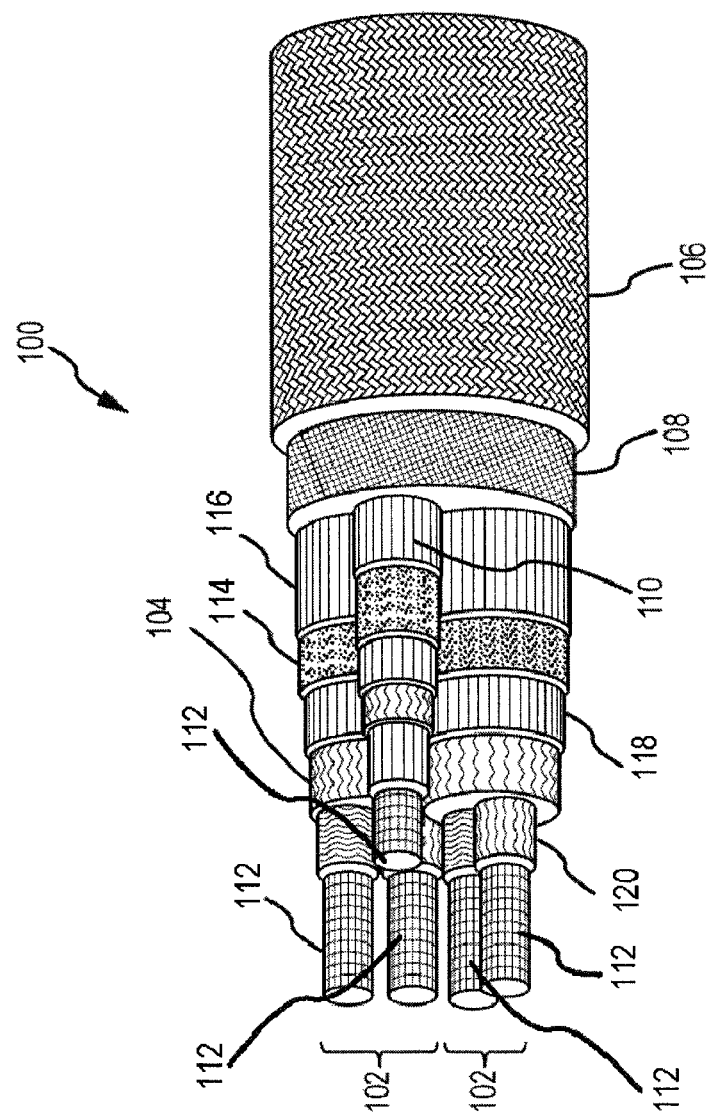
FIG. 1 illustrates a lightweight shield construction of a harness according to various embodiments.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the various disclosed embodiments, it should be understood that other embodiments may be realized and that logical, chemical and mechanical changes may be made without departing from the spirit and scope of the claimed embodiments. For example, the steps recited in any of the method or process descriptions may be executed in any order and are not necessarily limited to the order presented. Moreover, many of the functions or steps may be outsourced to or performed by one or more third parties. Furthermore, any reference to singular may include plural embodiments, and any reference to more than one component or step may include a singular embodiment or step. Also, any reference to attached, fixed, secured, connected or the like may include permanent, removable, temporary, partial, full and/or any other possible attachment option. Additionally, any reference to direct contact may include touching a portion.

As described in detail herein, lightweight electrical harnesses are disclosed according to various embodiments. In various embodiments, disclosed harnesses are capable of being used in aircraft, such as part of aircraft landing gear comprising an electrical system capable of transferring electrical signals or a gas turbine engine comprising an electrical system. In particular, harnesses disclosed herein may be used in an engine build up area of a gas turbine engine.

The term "connector" may include any suitable electrical connectors known now or hereinafter developed. Connectors include electrical connectors capable of being in electrical communication with conductive wires. The shape of the connector may be any shape, such as square, rectangular, conical, or circular. Various embodiments also include coupling connectors which can be coupled with or intermateable with various types of connectors, such as plugs or receptacles. Exemplary receptacles include receptacles which are compatible with connectors that comply with such industrial and governmental standards, such as EN2997, MIL-C-83723 Series III & ESC 10 connectors, 983 series connectors commercially available from DEUTSCH, the connection platform of TE Connectivity®, and 8535 and 83536 series connectors commercially available from SOURIAU CONNECTION TECHNOLOGY, the connection platform of ESTERLINE GROUP. In various embodiments, an electrical connector may comprise an aluminum shell and a stainless steel lock ring, a stainless steel shell and an aluminum lock ring, an aluminum shell and an aluminum lock ring, a stainless steel shell and a stainless steel lock ring. The particular material of connectors is not particularly limited and can include stainless steel, aluminum, and other metal alloys.

The term "electrically conductive wire" may include any suitable conductor, such as a wire having a central metal core capable of transmitting a signal and/or conducting electricity, conductive wires, and/or insulated conductive wires. In various embodiments, the metal may be copper, stainless steel, or any other metal or metal alloys capable of transmitting a signal and/or conducting electricity. The size of the electrically conductive wire is not particularly limited and can range from about 40 AWG (about 0.0799 mm) to about 0000 AWG (about 11.684 mm), from about 35 AWG (about 0.143 mm) to about 1 AWG (about 7.348 mm), and from about 15 AWG (about 1.450 mm) to about 5 AWG (about 4.621 mm). In various embodiments, the electrically conductive wire may form part of a shielded, jacketed cable, such as a single-core, shielded, jacketed cable, a two-core, shielded, jacketed cable, a three-core, shielded jacketed cable, or a four-core, shielded, jacketed cable.

The term "braided shield" may refer to a covering conductive layer of braided strands of metal fibers, synthetic fibers, metal coated synthetic fibers, and other suitable fibrous materials. Sizes of fiber braided shields are not particularly limited and can in various embodiments range from about 0.0062 inches (0.016 cm) to about 2.5 inches (6.35 cm) in diameter, from about 0.01 inches (0.0254 cm) to about 2 inches (5.08 cm) in diameter, and from about 0.1 (0.254) to about 1 inch (2.54 cm) in diameter. In various embodiments, the diameter of the shield can vary, for example, due to harness branching.

In various embodiments, a braided shield can help to impart protection against electromagnetic interference ("EMI"), radio-frequency interference ("RFI"), electromagnetic pulses ("EMPs"), heat, vibration, chafing, and/or stress loads, such as tension or weight. Braided shields may comprise metal clad fibers ("MCFs"). In various embodiments, the braided shields can effectively shield an electrically conductive wire across various frequencies, such as from about 0.1 MHz to about 40 GHz, from about 1 MHz to about 18 GHz, from about 15 MHz to about 500 MHz from about 30 MHz to about 100 MHz and from frequencies about 50 MHz and higher. The shielding effectiveness can also range in various embodiments, such as from about 0.1 dB to about 95 dB, from about 10 dB to about 80 dB, and from about 25 dB to about 70 dB.

In various embodiments, the braided shield can comprise a high strength braided shield. Various embodiments of high strength braided shields can have tensile strengths across a variety of ranges, such as from about 500 MPa to about 2,000 MPa, from about 1,000 MPa to about 1,700 MPa, and from about 1,200 MPa to about 1,600 MPa. The use of a high strength braided shield may negate the need for separate backshells by enabling the removal of separate strain reliefs. In various embodiments, this can help reduce the overall weight of an electrical harness and can provide weight savings (e.g., in a commercial aircraft). Moreover, the elimination of separate backshells in various embodiments, can eliminate failure sources of harnesses (e.g., such as those in commercial aircraft).

Figure 11:
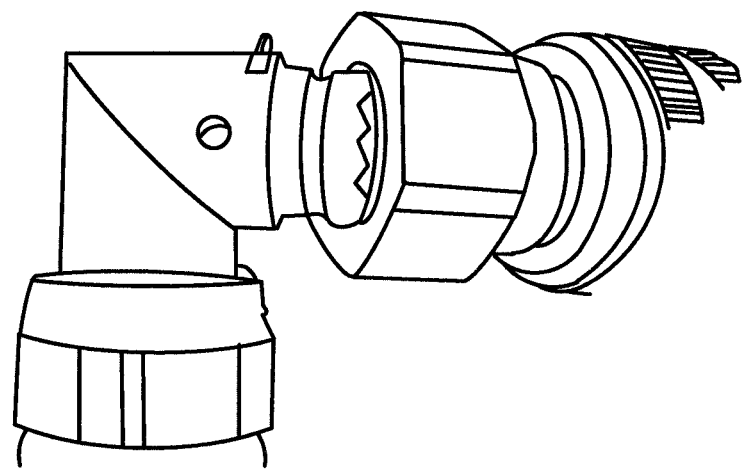
FIG. 11 illustrates a connection failure between an electrical connector and a backshell accessory.

Without being limited to any theory, it is believed that use of a separate backshell accessory can provide a source of failure for a harness due to the decreased ability of the separate backshell accessory and connector to absorb vibrations and temperature changes, such as the vibrations and temperature changes found in and around gas turbine engines. Electrical connectors without an integrated backshell typically employ a backshell accessory that comprises a separate backshell coupled to the electrical connector, typically via threaded engagement. The interface between the electrical connector and the backshell accessory is prone to failure. For example, vibration, handling, or other forces may stress the interface between the electrical connector and the backshell accessory, for example, the threaded engagement between the between the electrical connector and the backshell accessory. With temporary reference to FIG. 11, FIG. 11 illustrates failure of an electrical connector with a backshell accessory at the joint between the electrical connector and the backshell accessory. Thus, it is believed that where an electrical connector comprises an integrated backshell a point of failure is eliminated.

As used herein, the term "integrated backshell" may include an electrical connector having a land configured to directly connect a braided shield such as a MCF braided shield. In various embodiments, an electrical connector having an integrated backshell may allow an MCF braided shield to be secured directly to the electrical connector. In various embodiments, an electrical connector having an integrated backshell may also allow for either an overbraid layer or a heat shrink boot to be secured directly to the electrical connector.

Furthermore, in various embodiments the use of connectors with an integrated backshell can provide various methods for overbraid protection (e.g., polyetheretherketone ("PEEK") overbraid) and braided shield termination. In various embodiments, the use of MCF braided shields may allow for fabrication of harnesses without additional layers, such as a fiber glass protective layer. For example, an S-2 fiber glass protective layer may not be needed in addition to an MCF braided shield to achieve acceptable chafe protection.

An electrical harness may include additional protective layers, such as a S-2 fiber glass protective layer to protect electrically conductive wires from chafing, for additional insulation from heat and vibration, and for improved tensile strength. However, when a MCF braided shield is used as the braided shield with an electrical connector having an integrated backshell, additional protective layers may be eliminated, reducing overall weight of the electrical harness.

For example, where an MCF braided shield is used with an electrical connector having an integrated backshell, it has been found that the resistance of the harness to vibration and tensile stresses is unexpectedly improved. MCF typically has a high tensile strength. However, where MCF is connected to a backshell accessory, tensile stresses may be transferred to an electrical connector through the interface of a backshell accessory. As described above, the interface is often a point of failure. However, the use of an integrated backshell transfers tensile stresses directly to the electrical connector, where the tensile stresses are able to be more easily tolerated. This combination results in an electrical harness having an unexpectedly high tensile strength while reducing vibration interfaces, as well as being low in weight. Vibration testing confirms that an electrical harness comprising an MCF braided shield and an electrical connector having an integrated backshell maintains useful life after being subjected to conditions simulating that of an engine build up area of a turbofan engine. Thus, the combination of an MCF braided shield and an electrical connector with an integrated backshell has been found to improve reliability, reduce weight, and reduce the cost of producing the harness.

Moreover, a fine weave of the MCF braided shield may allow the harness to change direction while maintaining sufficient tensile strength, drapability, and sufficient resistance to EMI, RFI, and EMPs. For example, without being limited to any theory, it is believed that the finer weave of the MCF braided shield allows for the reduction in windowing, allowing the MCF braided shield to effective provide resistance to EMI, RFI, and EMPs.

Furthermore, it is also believed that the finer weave of the MCF braided shield eliminates the need of a protective layer between the electrically conductive wire and the braided shield, because the MCF braided shield comprises finely woven fibers. By eliminating chafing while simultaneously improving tensile strength, additional protective layers, such as the S-2 protective layer may be eliminated from part or all of the electrical harness. Also, it has been unexpectedly found that a harness with an MCF braided shield and an integrated backshell may sufficiently resist external forces such as heat and vibration without requiring additional protective layers, such as the S-2 protective layer.

As used herein "metal clad fiber" or "MCF" may include various fibers and woven braids of various metal clad fibers. In various embodiments, MCF comprises a synthetic fiber clad in a metal. In various embodiments, metal clad fibers may include various metals and alloys thereof, such as nickel, silver, gold, tin, aluminum, copper, cadmium, zinc, and/or stainless steel. The fibers of metal clad fibers may also include various thermoplastic fibers, such as polymers comprising 4,6-diamino-1,3-benzenediol dihydrochloride. Exemplary metal clad fibers include nickel clad thermoplastic fibers (as sold under the mark AmberStrand® Nickel Clad Fibers), silver clad thermoplastic fibers (as sold under the mark AmberStrand® Silver Clad Fibers), and nickel plated stainless steel micro filaments (as sold under the mark ArmorLite™), all of which are commercially available from Glenair®. Other examples of metal clad fibers include metal clad fibers incorporating aramid fibers (e.g., Kevlar®, which is a registered mark of E.I. du Pont de Nemours and Company), such as metal clad aramid fibers sold under the mark Aracon®, which are commercially available from Micro-Coax, Incorporated, or carbon fibers. In various embodiments, MCF may be used to enhance lower frequency shielding performance and provide protection against lightning. In various embodiments, MCF may also offer protection against engine environments, such as temperature changes, high vibrations, fluids, chemical resistance, and may offer galvanic capabilities.

The term "overbraid" may refer to any suitable covering for the harness. In various embodiments, the overbraid may provide additional protection, such as increased tensile strength, improved temperature resistance, and improved chafe resistance. The particular material of the overbraid is not particularly limited and may include suitable fibers in various embodiments, such as BMI (bismaleimide), PEEK (polyetheretherketone), PTFE (polytetraflouroethylene), PAEK (polyaryletherketone), polyurethane, polyamides (such as nylon), stainless steel, polyester such as that sold under the marks Monel® and Hastelloy®, polypropylene, Kynar®, Nomex®, and aramid fibers, such as Kevlar®. For example, in various embodiments, the overbraid may include PEEK tubular overbraids, such as those commercially available from Glenair® (e.g., a 102-051 PEEK Tubular Braid).

The term "fiberglass" may encompass any glass fiber. Fiberglass may include any forms of yarns, including untwisted forming cakes, rovings, and chopped fibers. In various embodiments, the fiberglass may conform to military specifications such as MIL-R-60346, Type IV and MIL-Y-1140H. Exemplary fiberglass includes e-glass, S-2 glass Fiber® (a registered mark of the AGY Holding Corporation), and ZenTron® (also a registered mark of the AGY Holding Corporation).

The term "heatshrink material" may refer to any suitable covering for the harness capable of contracting when heated. Exemplary suitable heatshrink material for various embodiments may include heatshrink tubing, heatshrink sleeving, heatshrink boots, and heatshrink backshell assemblies. In various embodiments the heatshrink may comprise modified elastomeric materials or polyolefins. In various embodiments these materials may have characteristics which include at least one of being soft, relatively thick (e.g., more than about ⅛ of an inch), relatively thermally resistant (e.g., to temperatures below about 518° F. (about 270° C.)), electrical insulation, improved weathering to oxygen, light, and/or ozone, and improved resistance to chemicals. In various embodiments, the heatshrink material may be a heatshrink boot and in various embodiments, may be configured to contract to become secured on a boot seat of an electrical connector. In various embodiments, the heatshrink boot may be substantially straight or may be angled (e.g., having an angle of about 30° or more, an angle of about 45°, or an angle of about 90°). Suitable heatshrink boots include the KTKK cable assemblies commercially available from IS-RAYFAST owned by TE Connectivity®.

Referring to FIG. 1, harness 100 is shown. In various embodiments, harness 100 may comprise two, two-core, shielded, jacketed cables 102 and single-core, shielded, jacketed cable 110, though in various embodiments, a harness may comprise a single-core, shielded, jacketed cable, a two-core, shielded, jacketed cable, or one or more of both a single-core, shielded, jacketed cable and a two-core, shielded, jacketed cable. While only two-core and single-core, shielded, jacketed cables are exemplified in FIG. 1, according to various embodiments, a harness may comprise any number of shielded, jacketed cables (e.g., three-core, shielded, jacketed cables, four-core, shielded, jacketed cables, etc.). In various embodiments, harness 100 comprises a portion of MCF braided shield 108, which may be in direct contact with overbraid 106. The two-core, shielded, jacketed cables 102 and single-core, shielded, jacketed cable 110 may comprise an electrically conductive wire 112, and first braided shield 104. In various embodiments, two-core, shielded, jacketed cables 102 and single-core, shielded, jacketed cable 110 may also comprise other layers, such as dielectric insulator layers 114, 116, 118, and 120.

Figure 10:
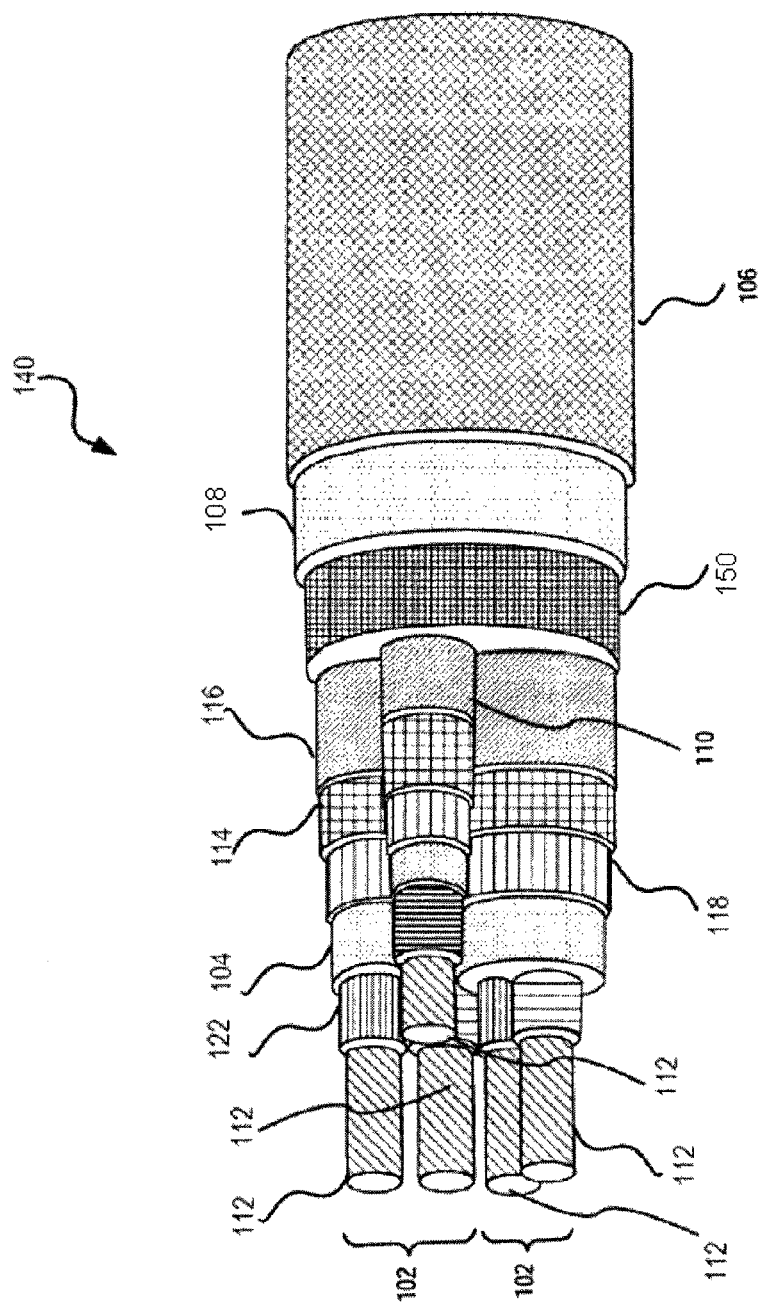
FIG. 10 illustrates a lightweight shield construction of a harness according to various embodiments.

With reference to FIG. 10, harness 140 is shown. Harness 140 shares many features with harness 100 and are labeled accordingly. However, harness 140 may comprise a fiber glass braided shield 150. Fiber glass braided shield 150 may comprise any suitable fiberglass braided structure, such as those discussed herein, for example, fiber glass braided shield 150 may comprise glass fibers sold under the mark S-2 glass Fiber® (a registered mark of the AGY Holding Corporation).

Figure 2:
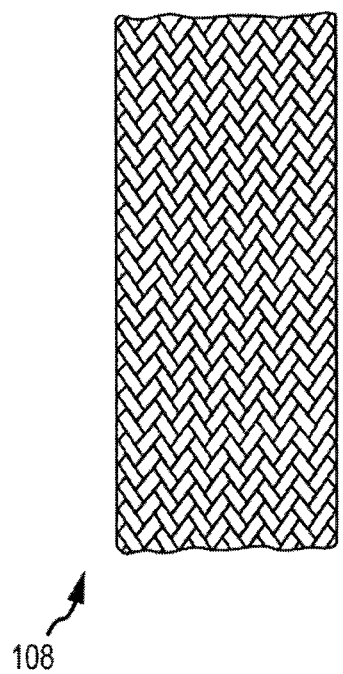
FIG. 2 illustrates braiding for metal clad fiber braided shields according to various embodiments.

Referring to FIG. 2, the weave of a MCF braided shield 108 is demonstrated according to various embodiments. The weave is not particularly limited and in various embodiments can include various types of plain weaves, basket weaves, twill weaves, and satin weaves. In various embodiments the weave can be a finer weave to allow for improved coverage and, thus, improved shielding (e.g., EMI shielding). Also, in various embodiments, finer weaves providing improved coverage may permit the use of large diameter backshells and small wire bundles. Without being limited to any theory, it is believed that finer weaves can help to protect against windowing when a harness is flexed, thus providing improved shielding. The MCF braided shields are not particularly limited in form and can be in the form of a braided sock or can be woven onto the electrical harness from a reel of material. In various embodiments, fibers can be woven from two or more spools, three or more spools, or four or more spools. It will be appreciated that the number of spools may affect the density of the weave of a braided shield and can be changed to achieve desired densities or coverage. Exemplary coverage may range according to various embodiments from about 60% coverage to about 99.8% coverage, from about 65% coverage to about 95% coverage, from about 70% coverage to about 85% coverage.

A first braided shield 104 disclosed herein is not particularly limited and can include nickel-coated copper braided shields and metal clad fibers. For example, referring to FIG. 1, various embodiments of harness 100 can comprise a nickel copper coated copper braided shield as first braided shield 104.

Figure 3A:
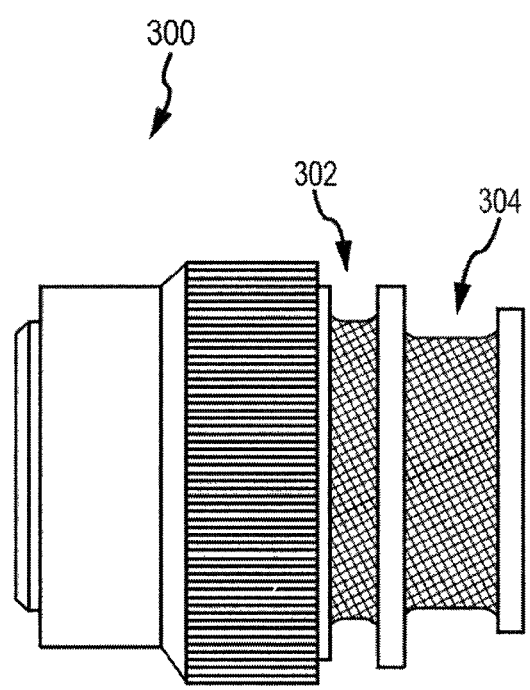
FIGS. 3A, 3B, 3C, and 3D illustrate various views of electrical connectors according to various embodiments.
Figure 3B:
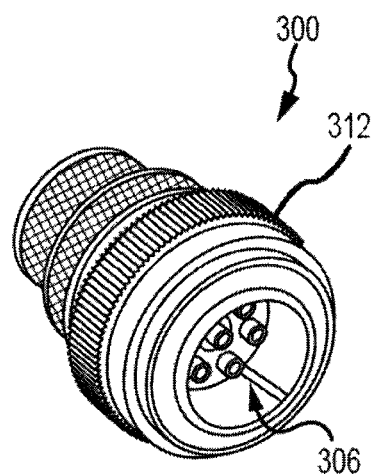
Figure 3C:
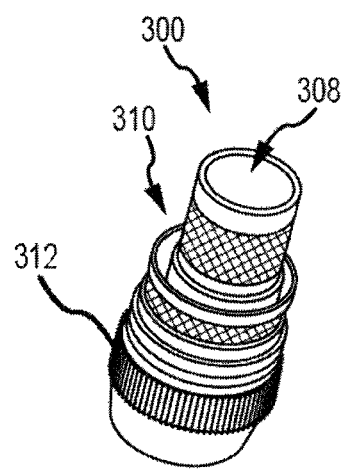
Figure 3D:
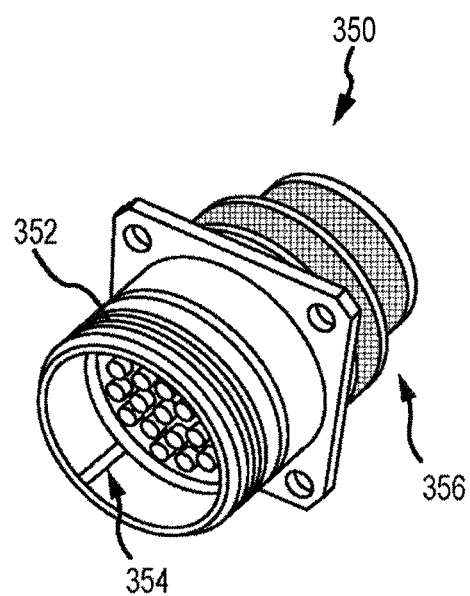

Referring to FIG. 3, FIGS. 3A, 3B, and 3C illustrate various views of a plug 300 which can be attached to a receptacle 350 shown in FIG. 3D. In various embodiments, plug 300 may fit into receptacle 350 through various keyways 306, 354. In various embodiments, plug 300 can comprise an integrated backshell 310 and a lock ring 312 which can engage in threading 352 of receptacle 350, which may also comprise an integrated backshell 356. In various embodiments, the wires can be connected to plug 300 through plug opening 308 of integrated backshell 310.

In various embodiments, plug 300, lock ring 312, integrated backshell 310, integrated backshell 356, threading 352, and receptacle 350 can be made of various materials, such as at least one of aluminum, stainless steel, and alloys thereof. In various embodiments, plug 300 and receptacle 350 may comply with various industrial and governmental standards and be fully interchangeable and intermateable with connectors that comply with such industrial and governmental standards, such as EN2997, MIL-C-83723 Series III & ESC 10 and 15 connectors, 983 series connectors commercially available from DEUTSCH, the connection platform of TE Connectivity®, and 8535 and 83536 series connectors commercially available from SOURIAU CONNECTION TECHNOLOGY, the connection platform of ESTERLINE GROUP.

As shown in FIG. 3A, various embodiments may comprise an electrical connector with an integrated backshell comprising a boot seat 302 and a braided shield land 304. In various embodiments, an overbraid (e.g., a PEEK overbraid) may terminate on boot seat 302.

Figure 4A:
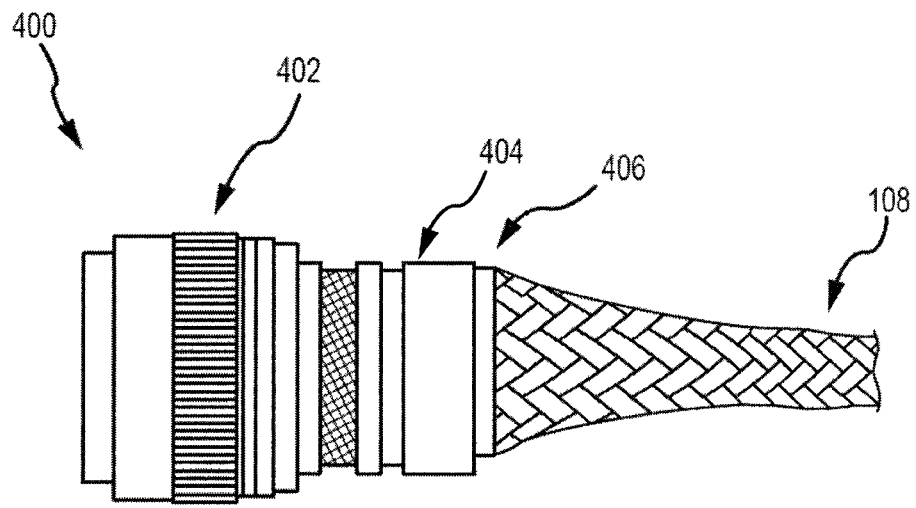
FIGS. 4A and 4B illustrate EMI shield terminations according to various embodiments.
Figure 4B:
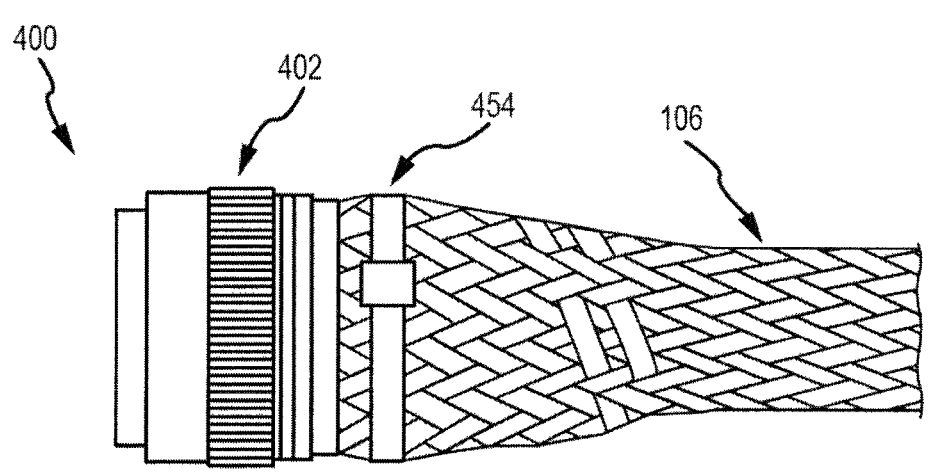

For example, with reference to FIGS. 4A and 4B, various views of harness 400 are shown. FIG. 4A illustrates a view of harness 400 beneath overbraid 106 (shown in FIG. 4B), whereas FIG. 4B illustrates an external view of harness 400. First, with reference to FIG. 4A, in various embodiments, MCF braided shield 108 surrounds integrated backing 406 and is connected to plug 402 through band clamp 404. With reference to FIG. 4B, an external view of harness 400 is shown. Overbraid 106 surrounds integrated backing 406 (with momentary reference to FIG. 4A) of plug 402 and is attached to plug 402 through band clamp 454.

Terminating the overbraid onto the boot seat of an electrical connector having an integrated backshell is believed to be a unique use of the boot seat. Strain testing confirms that an overbraid terminated on boot seat 302 for an electrical harness comprising an MCF braided shield and an electrical connector having an integrated backshell maintains useful life after being subjected to conditions simulating that of an engine build up area of a turbofan engine. Thus, the combination of an MCF braided shield and an electrical connector with an integrated backshell where the overbraid terminates on the boot seat has been unexpectedly found to improve reliability, reduce weight, and reduce the cost of producing the harness.

Figure 5:
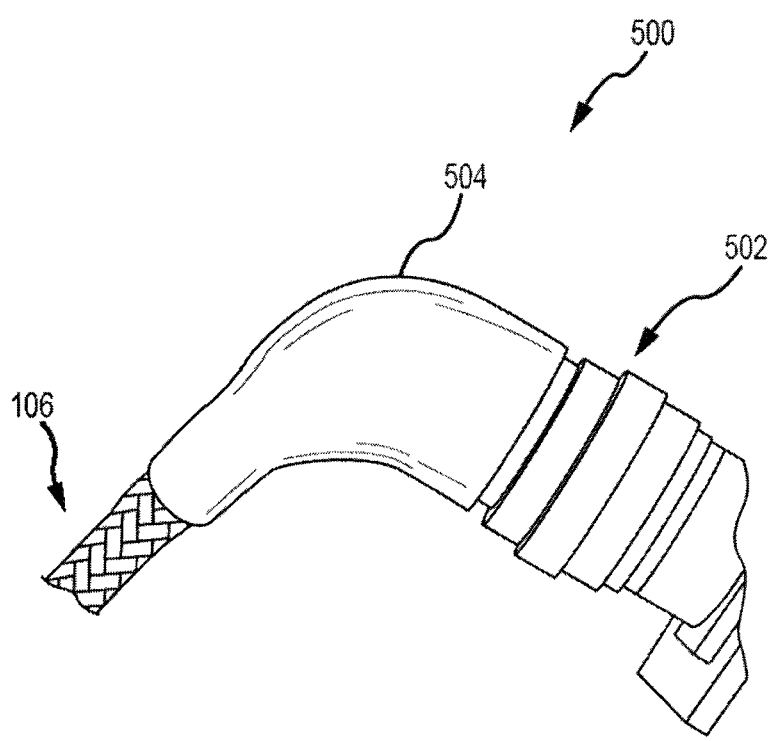
FIG. 5 illustrates a heatshrink boot installation according to various embodiments.

In various embodiments, harnesses may comprise a heatshrink material surrounds at least a portion of the overbraid. With reference to FIG. 5, an electrical harness 500 with heatshrink boot 504 is exemplified. In various embodiments, the addition of heatshrink material may aid in directing an electrical harness at an angle. The heatshrink material (exemplified in heatshrink boot 504), in various embodiments, may have angles of about 0° (i.e., a substantially straight boot), angles greater than about 30°, angles of about 45°, or angles of about 90°. In FIG. 5, a heatshrink boot 504 having an angle of about 90° is illustrated. As can be seen in FIG. 5, heatshrink boot 504 is connected to electrical connector 502, helping to provide a substantially 90° angle between electrical connector 502 and the portion of electrical harness 500 where overbraid 106 is exposed.

With temporary reference to FIG. 11, FIG. 11 illustrates an electrical connector with a metal backshell accessory having a sharp 90° angled turn. The backshell accessory with the sharp 90° angled turn can create an additional source of failure because the electrical wires within the harness can become compressed at the sharp 90° angled turn and over time can separate and, thus, lose the ability to transmit an electrical signal due to the conditions of an engine build up area of a turbofan engine. However, as can be seen in FIG. 5, the use of a heatshrink boot with a harness comprising an MCF braided shield and an electrical connector having an integrated backshell may create a more rounded path for the electrical wires and can help to absorb some of the conditions of an engine build up area of a turbofan. Vibration testing, high temperature and low temperature testing, and altitude testing confirm that use of an angled heatshrink boot unexpectedly can withstand the conditions of an engine build up area of a turbofan engine when used in conjunction with a MCF braided shield and an electrical connector having an integrated backshell. Moreover, a lighter weight heatshrink boot may enable an operator to manipulate the angle of the harness, whereas a harness with a heavier backshell accessory may not possess this flexibility because the angle is fixed by the manufacturer. Thus, the combination of an MCF braided shield, an electrical connector with an integrated backshell, and a heatshrink boot has been unexpectedly found to improve reliability, increase flexibility, reduce weight, and reduce the cost of producing the harness.

Figure 6:
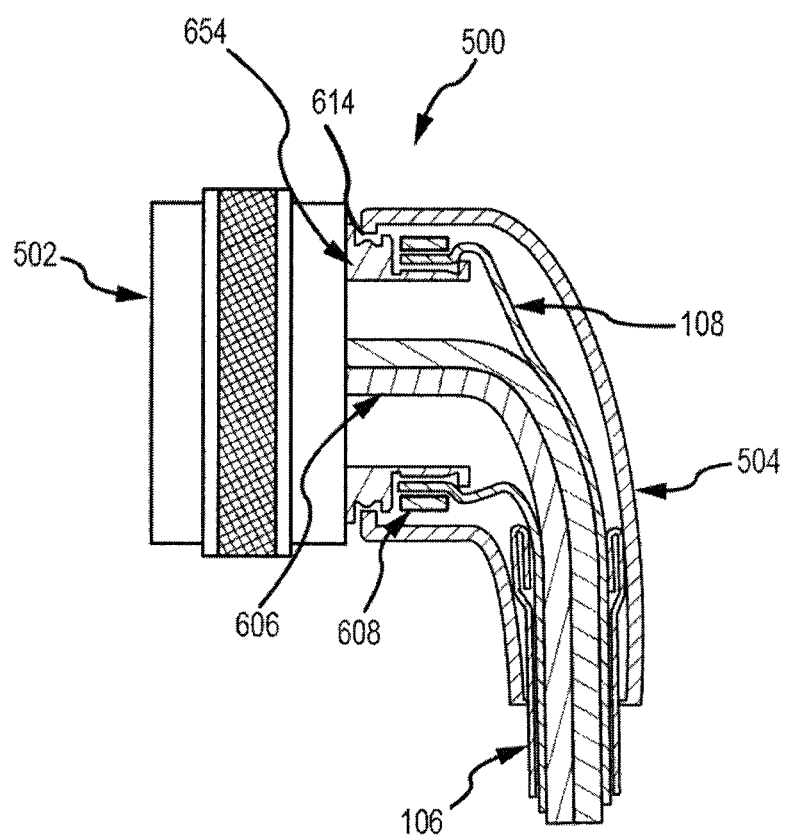
FIG. 6 illustrates a cross-sectional view of a terminal end of a lightweight electrical harness with a heatshrink boot according to various embodiments.

FIG. 6 illustrates a cross-sectional view of electrical harness 500. In various embodiments, as depicted in FIG. 6, wires 606 are connected to electrical connector 502 and are surrounded by MCF braided shield 108 and overbraid 106. MCF braided shield 108 may be connected to electrical connector 502 via integrated backshell 654 using band clamp 608. Around electrical connector 502 and overbraid 106, heatshrink boot 504 may be shrunk on to boot seat 614. Heatshrink boot 504 may be shrunk on to boot seat 614 and overbraid 106 may be terminated short of the electrical connector 502, but within the coverage of heatshrink boot 504 to help secure overbraid 106.

Figure 7:
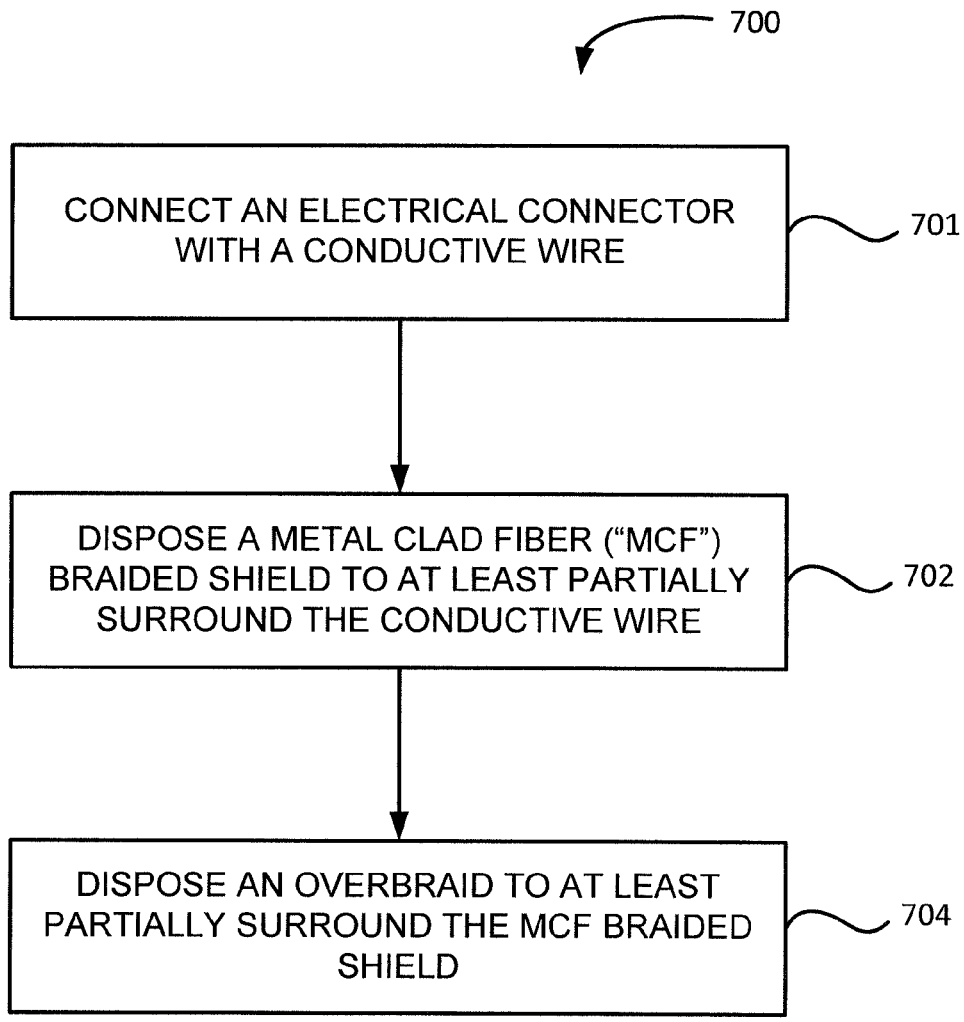
FIG. 7 illustrates methods of making an electrical harness according to various embodiments.

FIG. 7 illustrates methods 700 for forming an electrical harness according to various embodiments. Methods 700 comprise connecting an electrical connector with a conductive wire (step 701) and disposing a metal clad fiber ("MCF") braided shield to at least partially surround a conductive wire (step 702). Methods 700 may also comprise disposing an overbraid to at least partially surround the MCF shield (step 704).

Figure 8:
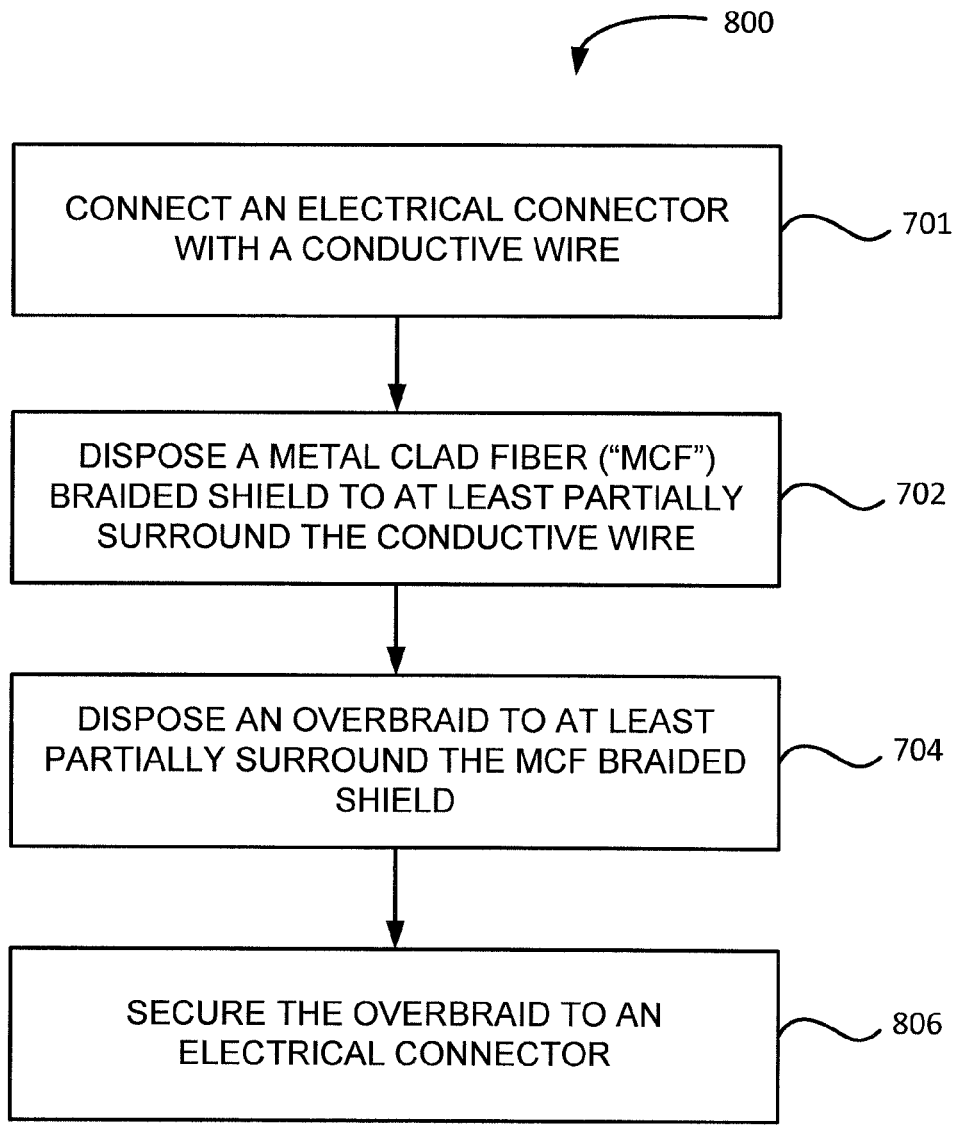
FIG. 8 illustrates methods of making an electrical harness according to various embodiments.

FIG. 8 illustrates methods 800 for forming an electrical harness according to various embodiments. Methods 800 may comprise connecting an electrical connector with a conductive wire (step 701) and disposing a metal clad fiber ("MCF") braided shield to at least partially surround a conductive wire (step 702). Methods 800 also comprise disposing an overbraid to at least partially surround the MCF shield (step 704). The overbraid may also be secured directly on an electrical connector (step 806). In various embodiments the overbraid can be secured directly on an electrical connector (e.g., a plug or a receptacle) by a band clamp or other securing device.

Figure 9:
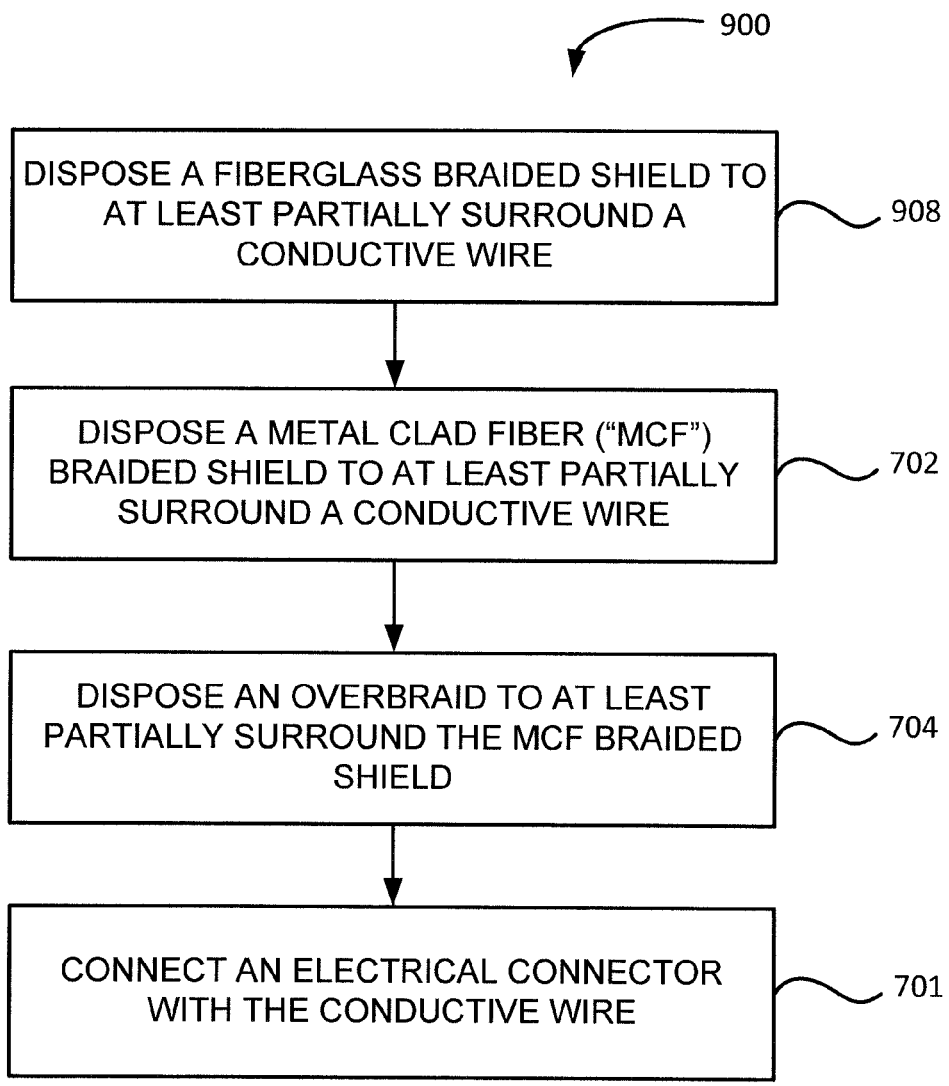
FIG. 9 illustrates methods of making an electrical harness according to various embodiments.

FIG. 9 illustrates methods 900 for making an electrical harness. Methods 900 may include disposing a fiberglass braided shield to at least partially surround a conductive wire (step 908). Methods 900 may also comprise disposing a metal clad fiber ("MCF") braided shield to at least partially surround a conductive wire (step 702). In methods 900, the MCF braided shield can be in direct contact with the disposed fiberglass braided shield. Methods 900 also comprise disposing an overbraid to at least partially surround the MCF shield (step 704). Methods 900 may also comprise connecting an electrical connector with a conductive wire (step 701).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of embodiments encompassed by this disclosure. The scope of the claimed matter in the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C." Different cross-hatching is used throughout the figures to denote different parts but not necessarily to denote the same or different materials.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrical harness comprising:
    an electrically conductive wire;
    an electrical connector in electrical communication with the conductive wire;
    a metal clad fiber ("MCF") braided shield surrounding a portion of the electrically conductive wire, the MCF braided shield comprising a metal-clad fiber, the metal-clad fiber comprising a synthetic fiber clad in a metal; and
    an overbraid surrounding a portion of the MCF braided shield,
    a heatshrink material surrounding at least a portion of the overbraid,
    wherein the electrical connector comprises an integrated metallic backshell comprising a boot seat and a separate land;
    the MCF braided shield terminates on the separate land, the MCF braided shield perimetrically surrounding a radially outer surface of the separate land;
    the MCF braided shield is secured directly to the integrated metallic backshell of the electrical connector;
    the overbraid is secured directly to the electrical connector;
    the heatshrink material comprises a heatshrink boot secured to the boot seat of the electrical connector, wherein the heatshrink boot perimetrically surrounds a radially outer surface of the boot seat;
    the overbraid terminates on the boot seat, the overbraid perimetrically surrounding a radially outer surface of the boot seat; and
    the overbraid axially extends beyond the MCF braided shield.

2. The electrical harness according to claim 1, further comprising a fiberglass braided shield surrounding the portion of the electrically conductive wire.

3. The electrical harness according to claim 2, wherein the fiberglass braided shield is surrounded by the MCF braided shield.

4. The electrical harness according to claim 2, wherein the MCF braided shield comprises nickel plated stainless steel clad micro filaments.

5. The electrical harness according to claim 2, wherein the electrically conductive wire forms part of a shielded jacketed cable.

6. The electrical harness according to claim 1, wherein the electrical connector comprises at least one of a stainless steel shell, an aluminum shell, an aluminum lock ring, and a stainless steel lock ring.

7. The electrical harness according to claim 1, wherein the MCF braided shield comprises aramid fibers.

8. The electrical harness according to claim 1, wherein the overbraid comprises polyetheretherketone.

9. The electrical harness of claim 1, wherein the overbraid comprises at least one of polyaryletherketone (PAEK), polytetraflouroethylene (PTFE), or polyetheretherketone (PEEK) tubular overbraids.

10. A method of making an electrical harness comprising:
connecting an electrical connector with a conductive wire, wherein the electrical connector comprises an integrated metallic backshell comprising a boot seat and a separate land;
disposing a metal clad fiber ("MCF") braided shield to at least partially surround the conductive wire wherein the MCF braided shield comprises a metal-clad fiber, the metal-clad fiber comprising a synthetic fiber clad in a metal;
disposing an overbraid to at least partially surround the MCF braided shield;
disposing a heatshrink material to surround at least a portion of the overbraid; and
disposing the MCF braided shield to at least partially surround a radially outer surface of the separate land, wherein the MCF braided shield is secured directly to the integrated metallic backshell of the electrical connector;
the overbraid is secured directly to the electrical connector;
the heatshrink material comprises a heatshrink boot secured to the boot seat of the electrical connector, wherein the heatshrink boot perimetrically surrounds a radially outer surface of the boot seat;
the overbraid terminates on the boot seat, the overbraid perimetrically surrounding a radially outer surface of the boot seat; and
the overbraid axially extends beyond the MCF braided shield.

11. The method of making an electrical harness according to claim 10, further comprising securing the overbraid directly to the electrical connector.

12. The method of making an electrical harness according to claim 10, further comprising disposing a fiberglass braided shield to at least partially surround the conductive wire.

13. The electrical harness of claim 10, wherein the heatshrink boot comprises a substantially straight heatshrink boot or an angled heatshrink boot.

* * * * *